United States Patent
Kucera et al.

(10) Patent No.: US 12,041,586 B2
(45) Date of Patent: Jul. 16, 2024

(54) METHOD FOR OVERHEAD REDUCTION IN NR SIDELINK INTER-UE COORDINATION (IUC)

(71) Applicant: Nokia Technologies Oy, Espoo (FI)

(72) Inventors: Stepan Kucera, Munich (DE); Daniel Medina, Munich (DE); Berthold Panzner, Holzkirchen (DE)

(73) Assignee: Nokia Technologies Oy, Espoo (FI)

( * ) Notice: Subject to any disclaimer, the term of this patent is extended or adjusted under 35 U.S.C. 154(b) by 367 days.

(21) Appl. No.: 17/568,326

(22) Filed: Jan. 4, 2022

(65) Prior Publication Data
US 2023/0217416 A1 Jul. 6, 2023

(51) Int. Cl.
*H04W 72/02* (2009.01)
(52) U.S. Cl.
CPC .................... *H04W 72/02* (2013.01)
(58) Field of Classification Search
CPC .................. H04W 72/02; H04W 72/20
See application file for complete search history.

(56) References Cited

U.S. PATENT DOCUMENTS

| | | | | |
|---|---|---|---|---|
| 2022/0400469 A1* | 12/2022 | Li | ................ | H04W 74/0808 |
| 2023/0039093 A1* | 2/2023 | Xiang | ................ | H04W 72/0453 |
| 2023/0209388 A1* | 6/2023 | Hwang | ................ | H04W 28/0236 370/329 |
| 2023/0217416 A1* | 7/2023 | Kucera | ................ | H04W 72/02 370/329 |

FOREIGN PATENT DOCUMENTS

WO WO-2020/143833 A1 7/2020
WO WO-2020/145807 A1 7/2020

OTHER PUBLICATIONS

3GPP TSG-RAN WG1 Meeting #107-e "Introduction of NR Sidelink Enhancements" Electronic Meeting, Nov. 11-19, 2021. R1-2112956.
3GPP TSG RAN WG1 Meeting #107-e "Feature Lead Summary #5 for AI 8.11.1.2 Inter-UE Coordination for Mode 2 Enhancements" e-Meeting, Nov. 11-19, 2021. R1-2112756.
Discussion on resource allocation for V2V communications:, Nokia Networks, 3GPP TSG RAN WG1 Meeting #83, R1-157157, Nov. 2015, 4 pages.
"Discussion on feasibility and benefit of mode 2 enhancements", Spreadtrum Communications, 3GPP TSG RAN WG1 #102-e, R1-2006268, Aug. 2020, 4 pages.

* cited by examiner

*Primary Examiner* — Jae Y Lee
(74) *Attorney, Agent, or Firm* — Harrington & Smith

(57) ABSTRACT

A UE may receive a request for a set of resource recommendations; determine a current set of resource recommendations; and transmit an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

20 Claims, 11 Drawing Sheets

| IUC MAC HEADER FORMAT | 730 length | 720 T_ref_offset₁ | T_ref_offset₂ | ... | T_ref_offsetₘ |
|---|---|---|---|---|---|
| Reuse TFRIV₁ | | | | | |
| Reuse TFRIV₂ | | | | | |
| ... | | | | | |
| Reuse TFRIVₘ | | | | | |

FIG. 7A

| IUC MAC HEADER FORMAT | 760 length | Reuse TFRIV₁ | T_ref_offset₁ | ... | Reuse TFRIVₘ | T_ref_offsetₘ |

FIG. 7B

METHOD FOR OVERHEAD REDUCTION IN NR SIDELINK INTER-UE COORDINATION (IUC)

TECHNICAL FIELD

The example and non-limiting embodiments relate generally to inter-UE coordination (IUC) and, more particularly, to repetitive feedback.

BACKGROUND

It is known, in IUC, to use differential/delta coding to reduce the overhead of repetitive feedback.

SUMMARY

The following summary is merely intended to be illustrative. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: receive, from a user equipment, a request for a set of resource recommendations; determine a current set of resource recommendations; and transmit, to the user equipment, an indication of the current set of resource recommendations, wherein the indication of the current set of resource recommendations comprises at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one aspect, a method comprising: receiving, from a user equipment, a request for a set of resource recommendations; determining a current set of resource recommendations; and transmitting, to the user equipment, an indication of the current set of resource recommendations, wherein the indication of the current set of resource recommendations comprises at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one aspect, a non-transitory computer-readable medium comprising program instructions stored thereon which, when executed with at least one processor, cause the at least one processor to: receive, from a user equipment, a request for a set of resource recommendations; determine a current set of resource recommendations; cause transmitting, to the user equipment, of an indication of the current set of resource recommendations, wherein the indication of the current set of resource recommendations comprises at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one aspect, an apparatus comprising: at least one processor; and at least one memory including computer program code; the at least one memory and the computer program code configured to, with the at least one processor, cause the apparatus at least to: transmit, to a user equipment, a request for a set of resource recommendations; and receive, from the user equipment, an indication of the current set of resource recommendations, wherein the indication of the current set of resource recommendations comprises at least one of: a first offset value associated with respective reference slots for respective resource recommendations of the current set of resource recommendations with respect to a previously received set of resource recommendations; or a second offset value associated with a reference slot for an indicated resource recommendation of the current set of resource recommendations with respect to the previously received set of resource recommendations.

In accordance with one aspect, a method comprising: transmitting, to a user equipment, a request for a set of resource recommendations; and receiving, from the user equipment, an indication of the current set of resource recommendations, wherein the indication of the current set of resource recommendations comprises at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one aspect, a non-transitory computer-readable medium comprising program instructions stored thereon which, when executed with at least one processor, cause the at least one processor to: cause transmitting, to a user equipment, of a request for a set of resource recommendations; and receive, from the user equipment, an indication of the current set of resource recommendations, wherein the indication of the current set of resource recommendations comprises at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

BRIEF DESCRIPTION OF THE DRAWINGS

The foregoing aspects and other features are explained in the following description, taken in connection with the accompanying drawings, wherein:

FIG. 7A is a diagram illustrating features as described herein;

FIG. 7B is a diagram illustrating features as described herein;

DETAILED DESCRIPTION OF EMBODIMENTS

Figure 1:
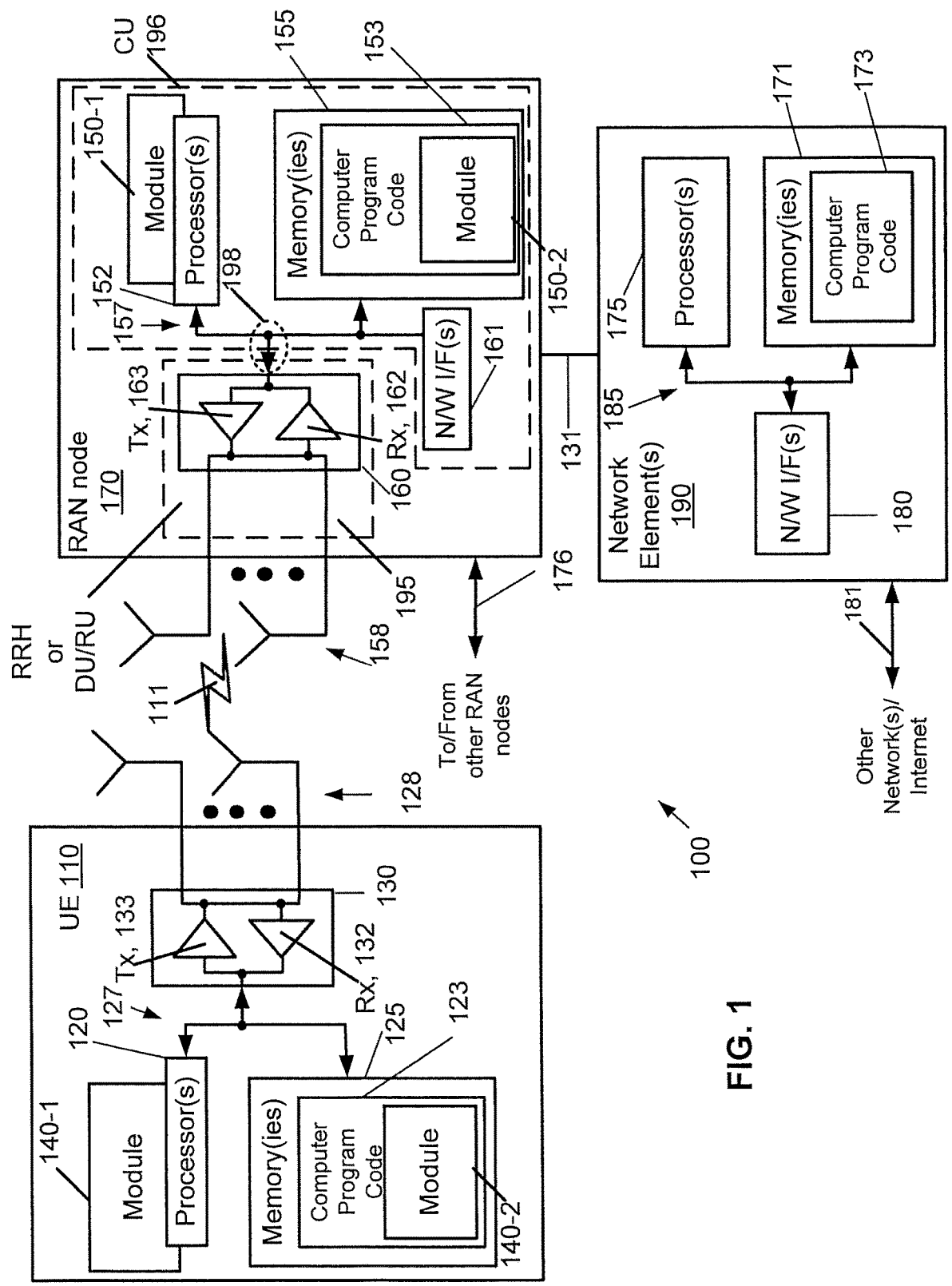
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
CE control element
CU central unit
D2D device-to-device
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FRIV frequency resource indication value
gNB (or gNodeB) base station for 5G/NR, i.e., a node providing NR user plane and control plane protocol terminations towards the UE, and connected via the NG interface to the 5GC
I/F interface
IE information element
IUC inter-UE coordination
L 1 layer 1
LTE long term evolution
MAC medium access control
MME mobility management entity
ng or NG new generation
ng-eNB or NG-eNB new generation eNB
NR new radio
N/W or NW network
Oct octet
PDCP packet data convergence protocol
PDU protocol data unit
PHY physical layer
ProSe proximity service
PSCCH physical sidelink control channel
PSSCH physical sidelink shared channel
RAN radio access network
RF radio frequency
RIV resource indication value
RLC radio link control
RRC radio resource control
RRH remote radio head
RS reference signal
RSRP reference signal received power
RSW resource selection window
RU radio unit
Rx receiver
SCI sidelink control information
SDAP service data adaptation protocol
SGW serving gateway
SL sidelink
SMF session management function
TRIV time resource indication value
Tx transmitter
UE user equipment (e.g., a wireless, typically mobile device)
UPF user plane function
V2X vehicle-to-everything Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

Although not illustrated in FIG. 1, the UE 110 may also communicate with other UEs via short range communication technologies, such as, IEEE 802.11p, Bluetooth® etc. If wireless communication with a network is unavailable or not possible, or in addition to network communication, the UE 110 may be capable of sidelink communication with other UEs.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, and user equipment configured to participate in sidelink scenarios, such as public safety user equipment and/or other commercial user equipment.

Features as described herein generally relate to, while not being limited to, new radio (NR) sidelink (SL). For example, NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may be implemented in scenarios unrelated to traffic users, such as public safety scenarios and/or commercial scenarios. Enhancements to sidelink procedures may be applicable in these vehicle-to-everything (V2X) and other use cases. It should be noted that enhancements to sidelink procedures may not be limited to unicast procedures; a person of ordinary skill in the art would understand that the present disclosure may relate to sidelink groupcast, multicast, and/or broadcast procedures as well.

Features as described herein generally relate to Rel-17 NR sidelink enhancements (RP-202846) for enhanced resource allocation mode 2 (autonomous resource selection). More specifically, features as described herein generally relate to Sidelink (SL) Inter-UE Coordination (IUC) scheme 1. Solutions for reporting the set of preferred/non-preferred resources from UE-A to UE-B may be discussed in the RAN1 #107bis-e and RAN2 #116bis-e meetings in January 2022.

Under agenda item 8.11.1.2, RAN1 #107-e (Nov 2021) has agreed on the following principles for IUC scheme 1 (R1-2112756):

" . . . Agreement (RAN1 #107-e)

For Scheme 1, a resource pool level (pre-)configuration can enable one of the following alternatives:

Alt 1 (Working Assumption): MAC CE or 2nd SCI are used as the container of inter-UE coordination information transmission from UE A to UE B.

For the indication of resource set, the following is supported:

N combinations of TRIV, FRIV, resource reservation period as specified in Rel-16 TS 38.214 Section 8.1.5 with following modification. The value of resource reservation period is omitted at least when the transmission of preferred resource set is triggered by UE-B's explicit request.

First resource location of each TRIV is separately indicated by the inter-UE coordination information If [N<=3], MAC CE is used and it is up to UE implementation to additionally use 2nd SCI. When 2nd SCI and MAC CE are both used, the same resource set is indicated in the 2nd SCI and the MAC CE. If [N>3], only MAC CE is used.

FFS: UE capability details

2nd SCI is UE RX optional

Alt 2: MAC CE is used as the container of inter-UE coordination information transmission from UE A to UE B.

For the indication of resource set, the following is supported:

N combinations of TRIV, FRIV, resource reservation period as specified in Rel-16 TS 38.214 Section 8.1.5 with following modification. The value of resource reservation period is omitted at least when the transmission of preferred resource set is triggered by UE-B's explicit request.

First resource location of each TRIV is separately indicated by the inter-UE coordination information FFS: Whether/How to use resource reservation information as coordination information . . . "

Based on Alternative 1 and Alternative 2 of the RAN1 #107-e agreement, the MAC CE is always present as a container for the IUC scheme 1 information, while the 2nd-stage SCI might optionally be supported.

This agreement has already been incorporated into a change request (CR) (R1-2112956), including the following clause:

" . . . 8.1.5A UE procedure for determining slots and resource blocks indicated by a preferred or non-preferred resource set The set of slots and resource blocks indicated by a set of preferred or non-preferred resource(s) is determined as described below.

The set of preferred or non-preferred resources $\{r_k\}$, $1 \leq k \leq K$, is indicated by M triplets $(TRIV_m, FRIV_m, P_{rsvp,m})$, $1 \leq M \leq K$, with the slot of the first resource location of each $TRIV_m$ separately indicated. [ $TRIV_m$ and [ $FRIV_m$ are interpreted according to clause 8.1.5, with the following modifications:

"slot where SCI format 1-A was received" is replaced by slot indicated as the first resource location of a $TRIV_n$.

"Received SCI format 1-A" is replaced by ($TRIV_m$, $FRIV_m$).

When the set is a preferred resource set, if the transmission of the set was triggered by an explicit request, the resource reservation interval $P_{rsvp,m}$ is omitted . . . "

The following clause from TS 38.214 defines the time resource indication value (TRIV) variable and the frequency resource indication value (FRIV):

" . . . 8.1.5 UE procedure for determining slots and resource blocks for PSSCH transmission associated with an SCI format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

'Time resource assignment' carries logical slot offset indication of N=1 or 2 actual resources when sl-MaxNumPerReserve is 2, and N=1 or 2 or 3 actual resources when sl-MaxNumPerReserve is 3, in a form of time RIV (TRIV) field which is determined as follows:

```
if N = 1
   TRIV = 0
elseif N = 2
   TRIV = t₁
else
   if (t₂ – t₁ – 1) ≤ 15
      TRIV = 30(t₂ – t₁ – 1) + t₁ + 31
   else
      TRIV = 30(31 – t₂ + t₁) + 62 – t₁
   end if
end if
``` where the first resource is in the slot where SCI format 1-A was received, and $t_i$ denotes i-th resource time offset in logical slots of a resource pool with respect to the first resource where for N=2, $1 \le t_1 \le 31$; and for N=3, $1 \le t_1 \le 30$, $t_1 < t_2 \le 31$.

The starting sub-channel $n_{subCH,0}^{start}$ of the first resource is determined according to clause 8.1.2.2. The number of contiguously allocated sub-channels for each of the N resources $L_{subCH} \ge 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$FRIV = n_{subCH,1}^{start} + \sum_{i=1}^{L_{subCH}-1}(N_{subchannel}^{SL}+1-i)$$

If sl-MaxNumPerReserve is 3 then $$FRIV = n_{subCH,1}^{start} + \sum_{i=1}^{L_{subCH}-1}(N_{subchannel}^{SL}+1-L_{subCH}+\sum_{i=1}^{subCH-1}(N_{subchannel}^{SL}+1-i)^2$$

where $n_{subCH,1}^{start}$ denotes the starting sub-channel index for the second resource $n_{subCH,2}^{start}$ denotes the starting sub-channel index for the third resource $N_{subchannel}^{SL}$ the number of sub-channels in a resource pool provided according to the higher layer parameter sl-NumSubchannel If TRIV indicates N<sl-MaxNumPerReserve, the starting sub-channel indexes corresponding to sl-MaxNumPerReserve minus N last resources are not used . . . "

The variable "Time resource assignment" may be compared with TRIV. The variable "Frequency resource assignment" may be compared with TRIV.

It may be noted that there are some limitations associated with the approach(es) to SL IUC as described above. The above IUC scheme(s) may be generalized to include three fundamental steps: (1) UE-B requests from UE-A, in an IUC request message, a set of preferred/non-preferred resources, as seen from UE-A's perspective (i.e. UE-A's recommendation); (2) UE-A then sends this information (set of preferred/non-preferred resources) in an IUC response message to UE-B; (3) UE-B finally uses this input to determine the most suitable transmission resources (e.g., by comparing them with its own transmission preferences) and carries out the actual sidelink transmission(s). In this example, UE-B may be considered a Tx UE that wishes to communicate with UE-A; UE-A may be considered an Rx UE. In the present description, "UE-A" may be used synonymously with "Rx UE," and "UE-B" may be used synonymously with "Tx UE."

With no loss of generality, it may be assumed that UE-A indicates K resource recommendations, $r_1$-$r_k$, and B bits are needed to describe each resource $r_k$ (slot and subchannel(s)) using TRIV/FRIV pairs. Accordingly, K×B bits are needed to deliver UE-A's recommendation(s) in response to each UE-B request (one IUC cycle).

In a (congested) channel with many randomly distributed reservations/transmissions, it may happen that UE-A's recommendation of preferred/non-preferred resources will change over time. Then, UE-A will send a different list of recommendations whenever UE-B requests it, and said K×B bits must be re-sent. In other words, in a scenario of changing network conditions, UE-A's response to UE-B's request may be at least partially different.

However, in some scenarios (e.g., sidelink channels with low or moderate traffic), it is very likely that UE-A will always recommend the same set of resources or a similar set of resources, with minimal change with respect to the previously indicated recommendation. Thus, a simple "reuse previous recommendation" message might be sufficient (theoretically 1 bit) to respond to UE-B's request message; there would be no need to repeat the previous delivery of K×B bits in the case of an unchanged resource recommendation.

Figure 2:
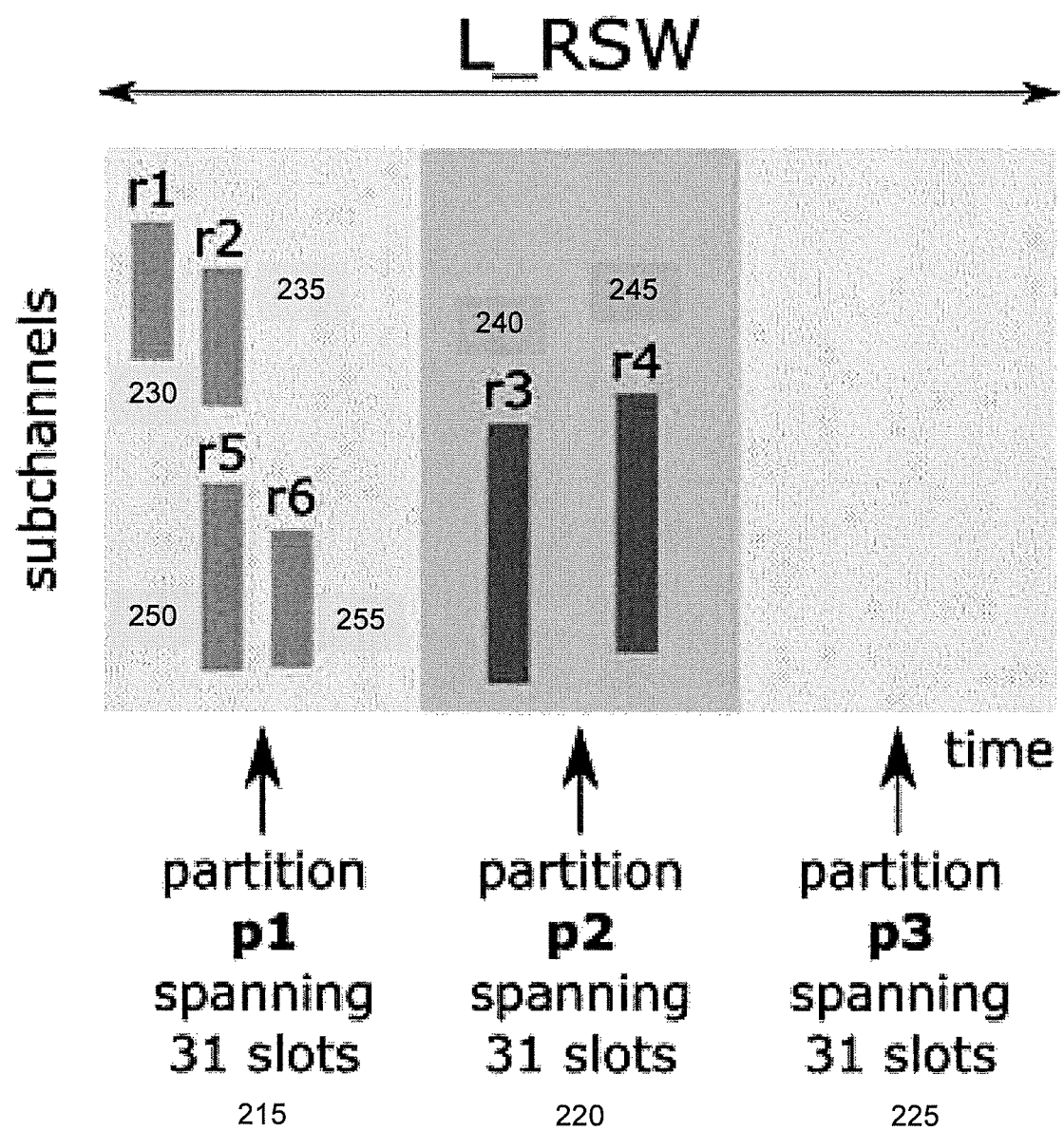
FIG. 2 is a diagram illustrating features as described herein.

Referring now to FIG. 2, illustrated is an example of the standardized R16-based reporting structure. FIG. 2 considers a representative example in which UE-A (i.e. an Rx UE) may recommend six (K=6) resources r1-r6 within a Resource Selection Window (RSW) defined by UE-B (i.e. a Tx UE). The RSW (210) may consist of three equal partitions $p_1$-$p_3$ (215, 220, 225) of total length L_RSW slots (i.e. 93 slots) along the time axis. Each partition may consist of 31 slots, corresponding to the time window associated with a TRIV. Resource blocks $r_1$ (230) and $r_2$ (235) as well as $r_3$ (240) and $r_4$ (245) have the same length and can be encoded together, while blocks $r_5$ (250) and $r_6$ (255) have different lengths and may be encoded individually. The example of FIG. 2 is not limiting; different numbers of partitions, numbers of resource blocks, resource block lengths, total length of RSW, distribution of resource blocks among the partitions, etc. may be possible.

UE-A may indicate a resource $r_k$ individually (for example, r5 (250) and r6 (255)) by using three parameters:

T_ref, a parameter that may indicate the reference slot for TRIV (i.e., the partition); TRIV[$t_k$], a TRIV-based parameter that may be derived from the associated slot $t_k$; and FRIV[$n_k$, $L_k$], a FRIV-based parameter that may be derived from the associated starting subchannel index $n_k$ and the resource length of contiguously allocated subchannels $L_k$.

In some cases, UE-A may indicate a pair of resources ($r_i$, $r_j$) jointly using a single TRIV/FRIV. This is possible whenever two resources $r_i$ and $r_j$ have the same length $L_i=L_j$ (=$L_{ij}$). For example, in FIG. 2, $r_1$ (230) and $r_2$ (235) have equal lengths along the subchannel axis, length $L_{12}$. In another example in FIG. 2, $r_3$ (240) and $r_4$ (245) have equal lengths along the subchannel axis, length $L_{34}$. These resources may need to occur in different slots (i.e., do not overlap in time) within a same partition. For example, $r_1$ (230) and $r_2$ (235) are in different time slots of partition $p_1$ (215), and $r_3$ (240) and $r_4$ (245) are in different time slots of partition $p_2$ (220).

In an example in which UE-A indicates a pair of resources jointly using a single TRIV/FRIV, three parameters may be obtained as follows: T_ref, a parameter that may indicate the reference slot for TRIV (i.e., the partition); TRIV[$t_i$, $t_j$], a TRIV-based parameter that may be derived from the associated slots $t_i$ and $t_j$; and FRIV[$n_i$, $n_j$, $L_{ij}$], a TRIV-based parameter that may be derived from the associated starting subchannel indices $n_i$ and $n_j$, and the length of contiguously allocated subchannels $L_{ij}$. Accordingly, UE-A may encode the exemplary 6 resources from FIG. 2 ($r_1$ (230), $r_2$ (235), $r_3$ (240), $r_4$ (245), $r_5$ (250), $r_6$ (255)) into 4 TRIV/FRIV pairs, as follows:

| | | | |
|---|---|---|---|
| m = 1: T_ref = 0 | TRIV[$t_1$, $t_2$] | FRIV[$n_1$, $n_2$, $L_{12}$] | |
| | (corresponds to resources $r_1$, $r_2$) | | |
| m = 2: T_ref = 31 | TRIV[$t_3$, $t_4$] | FRIV[$n_3$, $n_4$, $L_{34}$] | |
| | (corresponds to resources $r_3$, $r_4$) | | |
| m = 3: T_ref = 0 | TRIV[$t_5$] | FRIV[$n_5$, $L_5$] | |
| | (corresponds to resource $r_5$) | | |
| m = 4: T_ref = 0 | TRIV[$t_6$] | FRIV[$n_6$, $L_6$] | |
| | (corresponds to resource $r_6$) | | |

It may be noted that, because $r_1$ (230) and $r_2$ (235) are in the same partition $p_1$ (215) and have the same length, they may be communicated with a same TRIV/FRIV pair. It may be noted that, because $r_3$ (240) and $r_4$ (245) are in the same partition $p_2$ (220) and have the same length, they may be communicated with a same TRIV/FRIV pair. It may be noted that, because $r_5$ (250) and $r_6$ (255) do not have the same length, they may be communicated with different TRIV/FRIV pairs.

It may be noted that because $r_1$ (230), $r_2$ (235), $r_5$ (250) and $r_6$ (255) are in the same partition $p_1$ (215), the T_ref value is 0. It may be noted that, because $r_3$ (240) and $r_4$ (245) are in the same partition $p_2$ (220), the T_ref value is 31.

Differential/delta coding are methods for reducing overhead in view of repetitive feedback. Delta coding comprises including an indication of changes. Repetition coding comprises performing compression of repetitions. However, this coding is not possible in IUC scheme 1 due to the complex encoding format, which reuses the Rel-16 TRIV/FRIV duplets. To illustrate the difficulty with simply applying delta/repetition coding to such an encoding structure (i.e. IUC scheme 1) for overhead reduction, assume the following scenario illustrated in FIG. 3, in which UE-A observes periodic resources with no interference. UE-A may naturally consider these resources as its preferred resources for a future transmission by UE-B to UE-A.

Figure 3:
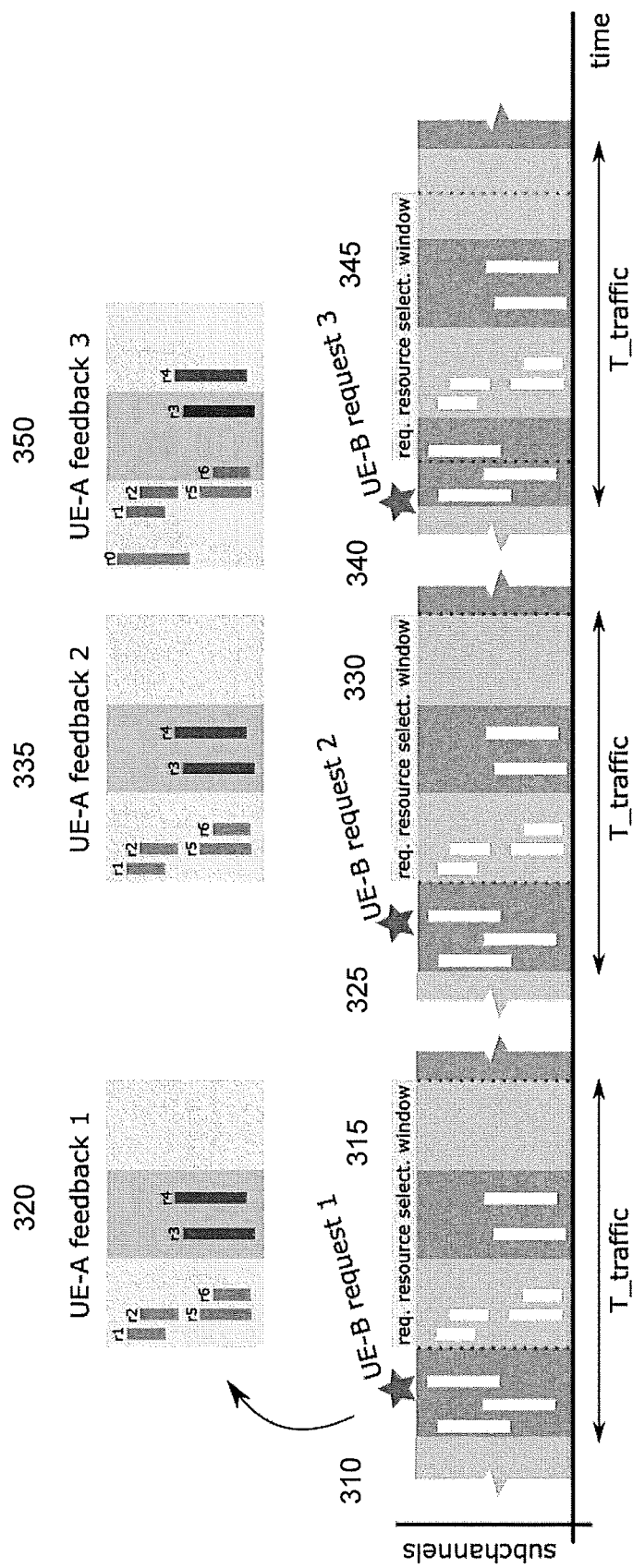
FIG. 3 is a diagram illustrating features as described herein.

In the example of FIG. 3, the initial IUC request from UE-B (310) may be based on the RSW1 (315), and UE-A may report (320) the preferred resources using the format derived in connection with FIG. 2:

| | | | |
|---|---|---|---|
| m = 1: T_ref = 0 | TRIV[$t_1$, $t_2$] | FRIV[$n_1$, $n_2$, $L_{12}$] | |
| | (corresponds to resources $r_1$, $r_2$) | | |
| m = 2: T_ref = 31 | TRIV[$t_3$, $t_4$] | FRIV[$n_3$, $n_4$, $L_{34}$] | |
| | (corresponds to resources $r_3$, $r_4$) | | |
| m = 3: T_ref = 0 | TRIV[$t_5$] | FRIV[$n_5$, $L_5$] | |
| | (corresponds to resource $r_5$) | | |
| m = 4: T_ref = 0 | TRIV[$t_6$] | FRIV[$n_6$, $L_6$] | |
| | (corresponds to resource $r_6$) | | |

Then, UE-B may issue a second IUC request for preferred resources (325). RSW2 (330) may be in perfect alignment with respect to RSW1 (315), and so UE-A may determine not only the same preferred resources, but also uses the same encoding in its second IUC response (335). Thus, an application of some delta/repetition coding scheme would be possible in this specific (corner) case.

It may be noted that methods such as delta/repetition coding might not be applicable to IUC, as currently defined by 3GPP, in scenarios where the RSW has changed but UE-A's preferred resource selection has not changed or has only changed minimally. In other words, delta/repetition coding might not be readily applied for IUC scheme 1 overhead reduction due to possible misalignment between consecutive RSWs.

However, for the third IUC request (340), RSW3 (345) is not perfectly aligned with RSW2 (330); it may be noted that the dotted line illustrating the left/earlier boundary of the requested resource selection window is shifted to the left with respect to RSW2 (330) and RSW1 (315). While in this (very common) case UE-A still observes the same preferred resources as in the previous two IUC cycles, the UE-A cannot use the same encoding (i.e. comparable/identical to 320 and 335). The reason is that the pair-wise encoded resources are no longer in the same partition. Moreover, a new preferred resource $r_0$ appears in RSW3 (345). The resulting encoding for RSW3 (350) may be as follows:

| | | | |
|---|---|---|---|
| m = 1: T_ref = 0 | TRIV[$t_0$] | FRIV[$n_0$, $L_0$] | |
| | (corresponds to resource $r_0$) | | |
| m = 2: T_ref = 0 | TRIV[$t_1'$, $t_2'$] | FRIV[$n_1$, $n_2$, $L_{12}$] | |
| | (corresponds to resources n, $r_2$) | | |
| m = 3: T_ref = 31 | TRIV[$t_3'$] | FRIV[$n_3$, $L_{34}$] | |
| | (corresponds to resource $r_3$) | | |
| m = 4: T_ref = 62 | TRIV[$t_4'$] | FRIV[$n_4$, $L_{34}$] | |
| | (corresponds to resource $r_4$) | | |
| m = 5: T_ref = 0 | TRIV[$t_5'$] | FRIV[$n_5$, $L_5$] | |
| | (corresponds to resource $r_5$) | | |
| m = 6: T_ref = 31 | TRIV[$t_6'$] | FRIV[$n_6$, $L_6$] | |
| | (corresponds to resource $r_6$) | | |

In the above notation, the prime in $t_k'$ is used to denote the logical slot offset of resource $r_k$ with respect to the beginning of RSW3 (345). In the above notation, $t_k$ is the logical slot offset of resource $r_k$ with respect to the beginning of RSW1 (315) and RSW2 (330). As illustrated in FIG. 3, the RSW3 (345) is shifted to the left with respect to RSW2 (330) and hence tk'>tk.

It may be noted that the first TRIV/FRIV resource has changed so that new preferred resource $r_0$ may be included in the encoding; m=1 refers to $r_0$ instead of $r_1$ and $r_2$. It may be noted that the resource blocks $r_3$ and $r_4$ are encoded with separate TRIV/FRIV pairs because they are no longer in the same partition. It may be noted that the resource blocks $r_5$ and $r_6$ are encoded with separate TRIV/FRIV pairs because they are no longer in the same partition.

Example embodiments of the present disclosure may define a UIC scheme that may have the technical effect of being efficient and/or permitting flexible reuse of a previously sent preferred/non-preferred resource set, while avoiding the limitations of simple differential/repetition coding. A technical effect of example embodiments of the present disclosure may be to substantially reduce the reporting overhead (theoretically up to K×B times).

In an example embodiment, there may be implemented an efficient IUC reporting scheme from UE-A to UE-B that has the technical effect of eliminate repetition overhead by using a concept of virtual resource selection windows. In an example embodiment, the IUC message from UE-A to UE-B may contain/comprise: a time offset T_ref_offset that may be added to all T_ref values of the TRIV/FRIV pairs, which may permit a shift (or calibration) in time of the start of all RSW partitions; and/or an increment value $D_k$ that may be added to the T_ref value associated with a resource $r_k$ to shift the slot of $r_k$ in time.

It may be noted that both the T_ref_offset and $D_k$ may relate to time. In other words, each may be considered a time offset value; T_ref_offset may be a first offset value that is globally applicable to all T_ref values (e.g. global offset value), while $D_k$ may be a second offset value that is individually/specifically/locally applicable to a specific T_ref value.

Figure 4:
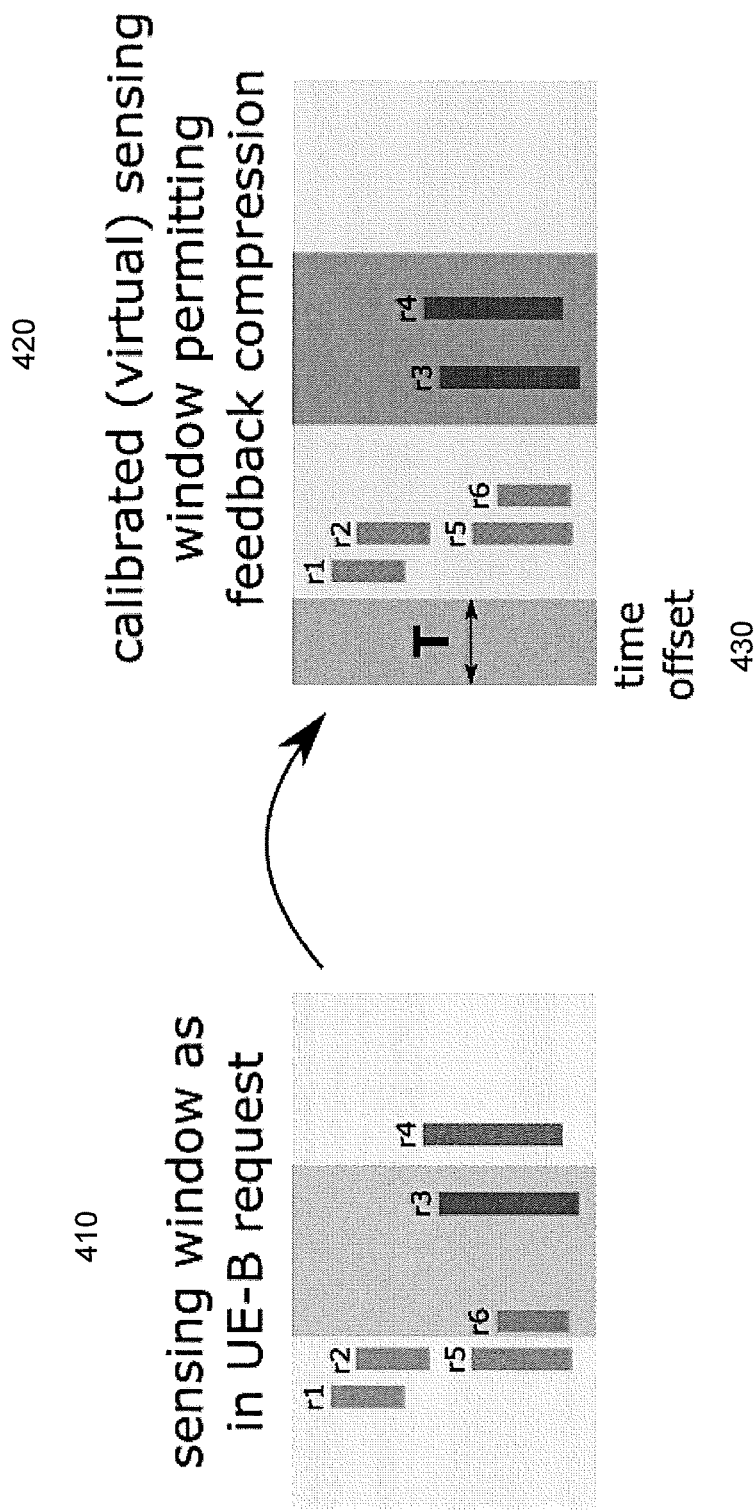
FIG. 4 is a diagram illustrating features as described herein.

By using these parameters, there may be created the notion of "virtual resource selection windows" that are properly aligned with the observed patterns of (periodic) traffic. Referring now to FIG. 4, which is based on the example of RSW3 (345) from FIG. 3, the "time alignment" of UE-A's response by a time offset "T" (430) may be indicated either in a collective manner by using T_ref_offset=T, or individually for each resource $r_k$ by using $D_k$=T.

In an example where T_ref_offset is used, the following may be the encoding, instead of the previously discussed encoding for 350:

| | | |
|---|---|---|
| T_ref_offset = T | | |
| m = 1: T_ref = 0 | TRIV[$t_1$, $t_2$] | FRIV[$n_1$, $n_2$, $L_{12}$] |
| (corresponds to resources $r_1$, $r_2$) | | |
| m = 2: T_ref = 31 | TRIV[$t_3$, $t_4$] | FRIV[$n_3$, $n_4$, $L_{34}$] |
| (corresponds to resources $r_3$, $r_4$) | | |
| etc. | | |

In this example, the UE-A may indicate T_ref_offset, and UE-B may add the offset T_ref_offset to each T_ref value of a previously received IUC message to derive the set of preferred resources illustrated in this encoding. It may be noted that $r_0$ is not included in this encoding. It may be noted that, in this example, individual TRIV/FRIV pairs may no longer be needed for resource blocks $t_3$ and $t_4$.

Referring now to FIG. 4, the sensing window as in the UE-B request, 410, is offset by time offset 430 to produce the calibrated (virtual) sensing window 420, permitting feedback compression. Enabling virtual resource selection windows may allow UE-A to encode preferred resources by using the same format as in previous IUC messages.

In an example where $D_k$ is used, the following may be the encoding, instead of the previously discussed encoding for 350:

...
m=3: T_ref=0+T TRIV[$t_5$] FRIV[$n_5$,$L_5$]
(corresponds to resource $r_5$)
...

In this example, the UE-A may indicate $D_k$, and UE-b may add the offset $D_k$ to the T_ref value of the specific $r_k$ of a previously received IUC message to derive the set of preferred resources illustrated in this encoding. In this example, the specific $r_k$ is $r_5$.

In an example embodiment, the TRIV and FRIV values encoding the observed preferred/non-preferred resources $r_k$ may remain invariant across IUC requests from UE-B, and so may be efficiently encoded by using delta/repetition coding.

To this end, in an example embodiment, repetitive TRIV and/or FRIV values in consecutive IUC response messages from UE-A may be replaced by short "reuse" indications. For example, one can use one or more of the following indications/flags: "reuseTriv" indication/flag, which may indicate that the $TRIV_m$ value (for a given m) from the previous IUC recommendation cycle may be reused; "reuseFriv" indication/flag, which may indicate that the $FRIV_m$ value (for a given m) from the previous IUC recommendation cycle may be reused; and/or "reuseTFriv" indication/flag, which may indicate that both the $TRIV_m$ and $FRIV_m$ values (for a given m) from the previous IUC recommendation cycle may be reused.

Additionally, in an example embodiment, in a special case where the entire description of the resource $TRIV_m$/$FRIV_m$ may be reused including the partition indication T_ref, then a "reuseResource" flag may be used.

Additionally, in an example embodiment, if the entire IUC message can be reused, the most efficient "reuseIUC-Message" may be used. By default, the last IUC message is meant if reuseIUCMessage=1, unless specified more accurately by using an index or sequence number indicating which message sent in the past is meant.

In an example embodiment, the reuse indicators/flags may be indicated either in a Sidelink IUC response MAC CE or, optionally, in a $2^{nd}$-stage SCI. For example, given the UE-A report for RSW1 (315) in the example of FIG. 3:

| | | |
|---|---|---|
| m = 1: T_ref = 0 | TRIV[$t_1$, $t_2$] | FRIV[$n_1$, $n_2$, $L_{12}$] |
| (corresponds to resources $r_1$, $r_2$) | | |
| m = 2: T_ref = 31 | TRIV[$t_3$, $t_4$] | FRIV[$n_3$, $n_4$, $L_{34}$] |
| (corresponds to resources $r_3$, $r_4$) | | |
| m = 3: T_ref = 0 | TRIV[$t_5$] | FRIV[$n_5$, $L_5$] |
| (corresponds to resource $r_5$) | | |
| m = 4: T_ref = 0 | TRIV[$t_6$] | FRIV[$n_6$, $L_6$] |
| (corresponds to resource $r_6$) | | | the UE-A may then, due to the perfect alignment of RSW2 (330) with respect to RSW1 (315), reuse the previously sent information and indicate the resource set with minimal overhead using any of these options:
Option 1:
reuseIUCMessage=1
Option 2:
m=1: reuseResource=1
(corresponds to resources $r_1$, $r_2$)
m=2: reuseResource=1
(corresponds to resources $r_3$, $r_4$)
m=3: reuseResource=1
(corresponds to resource $r_5$)
m=4: reuseResource=1
(corresponds to resource $r_6$)

In Option 1, the reuseIUCMessage flag may indicate that the entire last IUC message may be reused. In Option 2, the reuseResource flags may indicate that each respective resource may be reused.

In the example of FIG. 3, for RSW3 (345), there would be the need to also specify the associated time offset for RSW3 (345), as explained above. More specifically, these options may be possible:

---
Option 1:
---

$$T\_ref\_offset = T$$
$$reuseIUCMessage = 1$$
$$m = 5: T\_ref = 0 \quad TRIV[t_0] \quad FRIV[n_0, L_0]$$
(corresponds to resource $r_0$)

---
Option 2:
---

$$T\_ref\_offset = T$$
$m = 1$: reuseResource = 1
(corresponds to resources $r_1$, $r_2$)
$m = 2$: reuseResource = 1
(corresponds to resources $r_3$, $r_4$)
$m = 3$: reuseResource = 1
(corresponds to resource $r_5$)
$m = 4$: reuseResource = 1
(corresponds to resource $r_6$)
$m = 5: T\_ref = 0 \quad TRIV[t_0] \quad FRIV[n_0, L_0]$
(corresponds to resource $r_0$)

---
Option 3:
---

$m = 1: T\_ref = 0 + T$, reuseTrivFriv = 1
(corresponds to resources $r_1$, $r_2$)
$m = 2: T\_ref = 31 + T$, reuseTrivFriv = 1
(corresponds to resources $r_3$, $r_4$)
$m = 3: T\_ref = 0 + T$, reuseTrivFriv = 1
(corresponds to resource $r_5$)
$m = 4: T\_ref = 0 + T$, reuseTrivFriv = 1
(corresponds to resource $r_6$)
$m = 5: T\_ref = 0 \quad TRIV[t_0] \quad FRIV[n_0, L_0]$
(corresponds to resource $r_0$)

---

In Option 1, the reuseIUCMessage flag may indicate that the entire last IUC message may be reused. The TRIV/FRIV pair associated with $r_0$ and the T_ref_offset variable/parameter may be used by UE-B to derive the preferred/non-preferred resource set. In Option 2, the reuseResource flags may be used to indicate that the TRIV/FRIV pairs for the indicated resource blocks may be reused, as modified by the included T_ref_offset. Option 2 also includes a TRIV/FRIV pair for $r_0$. Option 3, the T_ref value for each resource (set) may be modified with the respective T, and the TRIV and FRIV values may be reused. Option 3 also includes a TRIV/FRIV pair for $r_0$.

In another example embodiment, the UE-A may be allowed to increase or decrease the reference signal received power (RSRP) threshold used for determining the preferred resources (i.e., allowing UE-A to recommend resources with higher/lower level of co-channel interference). In this way, the UE-A may maximize/control the number of resource recommendations that remain the same from one IUC cycle to another and that may be efficiently compressed. In other words, the UE-A may optimize the IUC response size by using the efficient "reuse" indicators/flags instead of verbose full-length resource descriptions. Threshold-related information may be part of the information exchange between UE-A and UE-B.

In an example embodiment, the MAC CE may be (re) designed for the IUC response message from UE-A to UE-B. The elements to be included in the MAC CE may comprise: MAC header format; length; TRIV value; FRIV value; RSW window size; and/or reuse flags (as).

In an example embodiment, the size of the IUCMAC-Headerformat (number of bits) may determine the number of different MAC CE designs/formats. In the example of TABLE 1 below, for IUCMACHeader=3bits, $2^{\wedge}=8$ different IUC MAC CE message formats may be possible:

TABLE 1

| IUC MAC HEADER | | | meaning |
|---|---|---|---|
| 0 | 0 | 0 | UE-A unable to propose set of preferred/non-preferred resources |
| 0 | 0 | 1 | ReuseIUCMessage no. x |
| 0 | 1 | 0 | reuseResource |
| 0 | 1 | 1 | reuseTFriv $r_k$ |
| 1 | 0 | 0 | reuseFriv $r_k$ |
| 1 | 0 | 1 | reuseTriv $r_k$ |
| ... | ... | ... | |

In an example embodiment, the length value may indicate the length of the MAC CE message, or the number of TRIV/FRIV pairs, or the number of resources $r_k$.

In an example embodiment, the maximum size of a TRIV value may be 9 bits, as one needs to encode log 2(nchoosek (31,2)+31+1)=log 2(497)=8.96 in a TRIV value.

In an example embodiment, the maximum size of a FRIV value may be 13 bits, as the maximum number of subchannels may be 27. The number of bits required to encode a FRIV value (with all maximum possible 27 subchannels) may be determined by log 2((27*28*55)/6)=12.76 bits.

In an example embodiment, the field size of the RSW windows may be determined by the bits needed to encode the number of partitions (e.g. 31 slots) comprising an RSW: log 2 (RSW/31). For example, for a RSW of 100 logical slots, one may need 2 bits. For a RSW of 1000 logical slots, one may need 5 bits.

In an example embodiment, the field size required for the 5 different indicators/flags (in section) may depend on the index m the reuse indicator/flag is referring to. For example, the reuse indicator/flag may refer to the reuse of the TRIV/FRIV pairs log 2 (m). For example, if UE-A recommends 10 pairs of TRIV/FRIV values, one may need 4 bits.

TABLE 2 illustrates example ranges for the size, in bits, of the elements that may be included in a MAC CE:

TABLE 2

| MAC CE element | Size in bits |
|---|---|
| IUCMACHeaderFormat | 1 . . . 4 |
| Length | 1 . . . 16 |
| TRIV | 9 |
| FRIV | 3 . . . 13 |
| RSW length | 2 . . . 8 |
| Reuse indicators | 1 . . . 8 |

Typically, MAC protocol data units (PDUs) and MAC CEs are byte-aligned, i.e. the elements are multiples of octets. If the field size of an information element (IE) within a MAC CE is smaller/larger than eight bits (for example, TRIV with 9 bits), so-called R bits (reserved bits) might be used to fill an octet, or the size of another variable IE may be chosen to fill up the remaining bits of an octet.

Figures 5A, 5B:
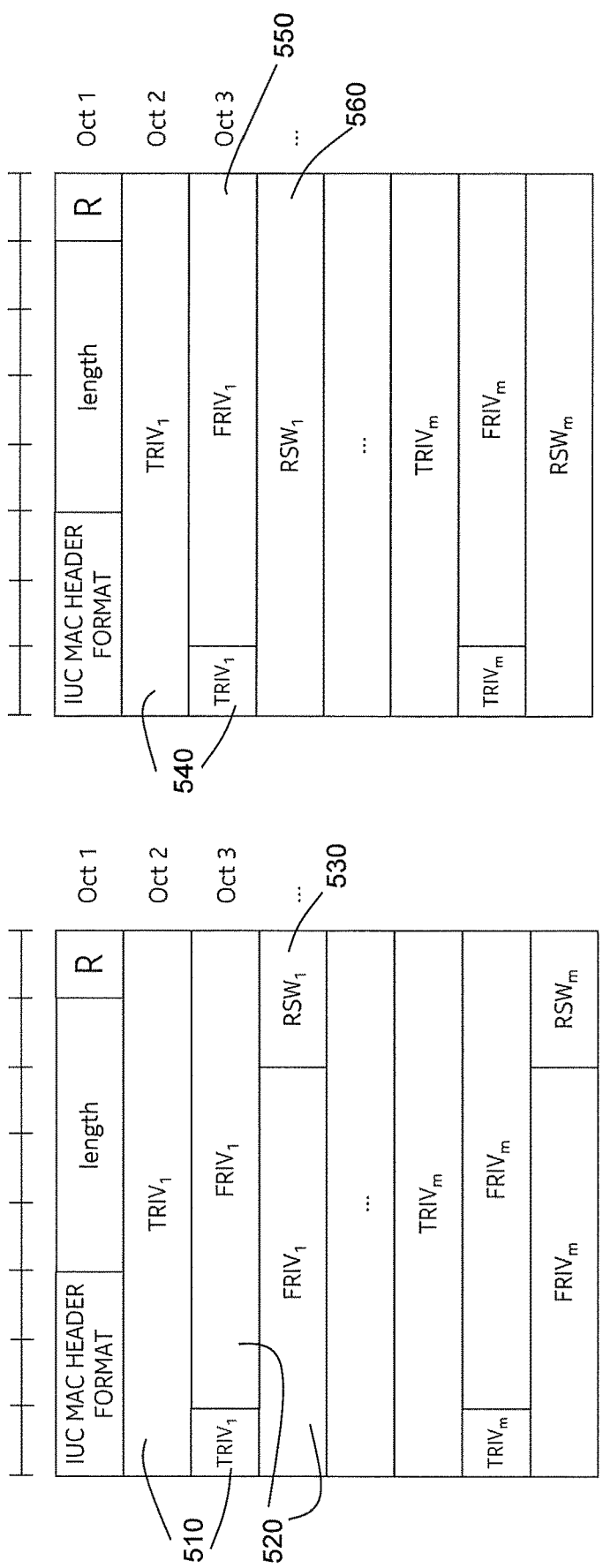
FIG. 5A is a diagram illustrating features as described herein.
FIG. 5B is a diagram illustrating features as described herein.

In an example embodiment, the MAC CE for the IUC response from UE-A to UE-B without compressed signaling may just comprise the pairs of TRIV/FRIV values and the corresponding length of the RSW, as the examples of FIGS. 5A-B illustrate. FIG. 5A illustrates an example of a MAC CE without using compression, with $TRIV_1$ 9 bits (510, between Oct 2 and Oct 3), $FRIV_1$ 13 bits (520, between Oct 3 and Oct 4), and RSW just 2 bits (530, Oct 4) (limiting RSW$_1$ to 4*31=124 slots). This format may be repeated for the m TRIV/FRIV pairs included in the MAC CE. FIG. 5B illustrates an example of a MAC CE without using compression, with TRIV$_1$ 9 bits (540, between Oct 2 and Oct 3), FRIV$_1$ 7 bits (550, Oct 3) (limiting the maximum subchannels to 7), and RSW$_1$ 8 bits (560, Oct 4) (allowing a large RSW$_1$ of 2^8*31=7936 slots). This format may be repeated for the m TRIV/FRIV pairs included in the MAC CE.

Figure 6:
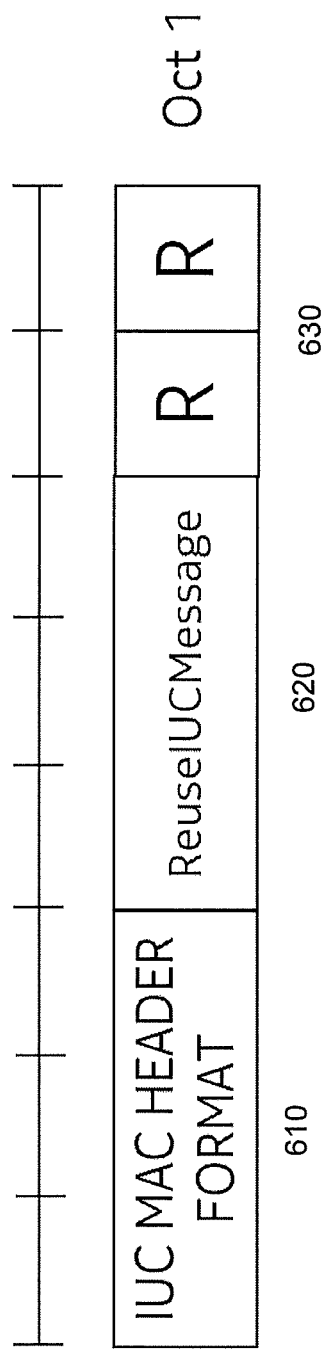
FIG. 6 is a diagram illustrating features as described herein.

In an example embodiment, in case the overhead reduction for the IUC response from UE-A to UE-B is used, the MAC CE may comprise the reuse indicators/flags as discussed above. Referring now to FIG. 6, illustrated is an example of MAC CE format 001, including IUC Mac header format 610, ReuseIUCMessage 620, and reserved bits 630. The complete IUC message mi (example with 3 bits) may be reused (for example, if ReuseIUCMessage=1, reuse last IUC response, if ReuseIUCMessage=2 reuse second last IUC response, etc.).

Referring now to FIGS. 7A-B, illustrated are examples of MAC CE format 01. Referring now to FIG. 7A, TRIV/FRIV pairs may be reused. In the example of FIG. 7A, the ReuseTFRIV indication may be 3 bits (710) referring to the 1 . . . 8 TRIV/FRIV pairs that have been signaled in the last response, the time offset may be 5 bits (720) referring to an offset of 1 . . . 32 slots covering one complete partition, and length may be 4 bits (730) referring to the MAC size in bytes of 2^length=16 octets. R reserved bits may also be included. This format may be included m times in the MAC CE format. Referring now to FIG. 7B, TRIV/FRIV pairs may be reused. In the example of FIG. 7B, the ReuseTFRIV indication may be 8 bits (740) referring to the 1 . . . 256 TRIV/FRIV pairs that have been signaled in the last response, the time offset may be 8 bits (750) referring to an offset of 1 . . . 256 slots covering eight partitions, and length may be 4 bits (760) referring to the MAC size in bytes of 2^=16 octets. R reserved bits may also be included. This format may be included m times in the MAC CE format.

Figure 8:
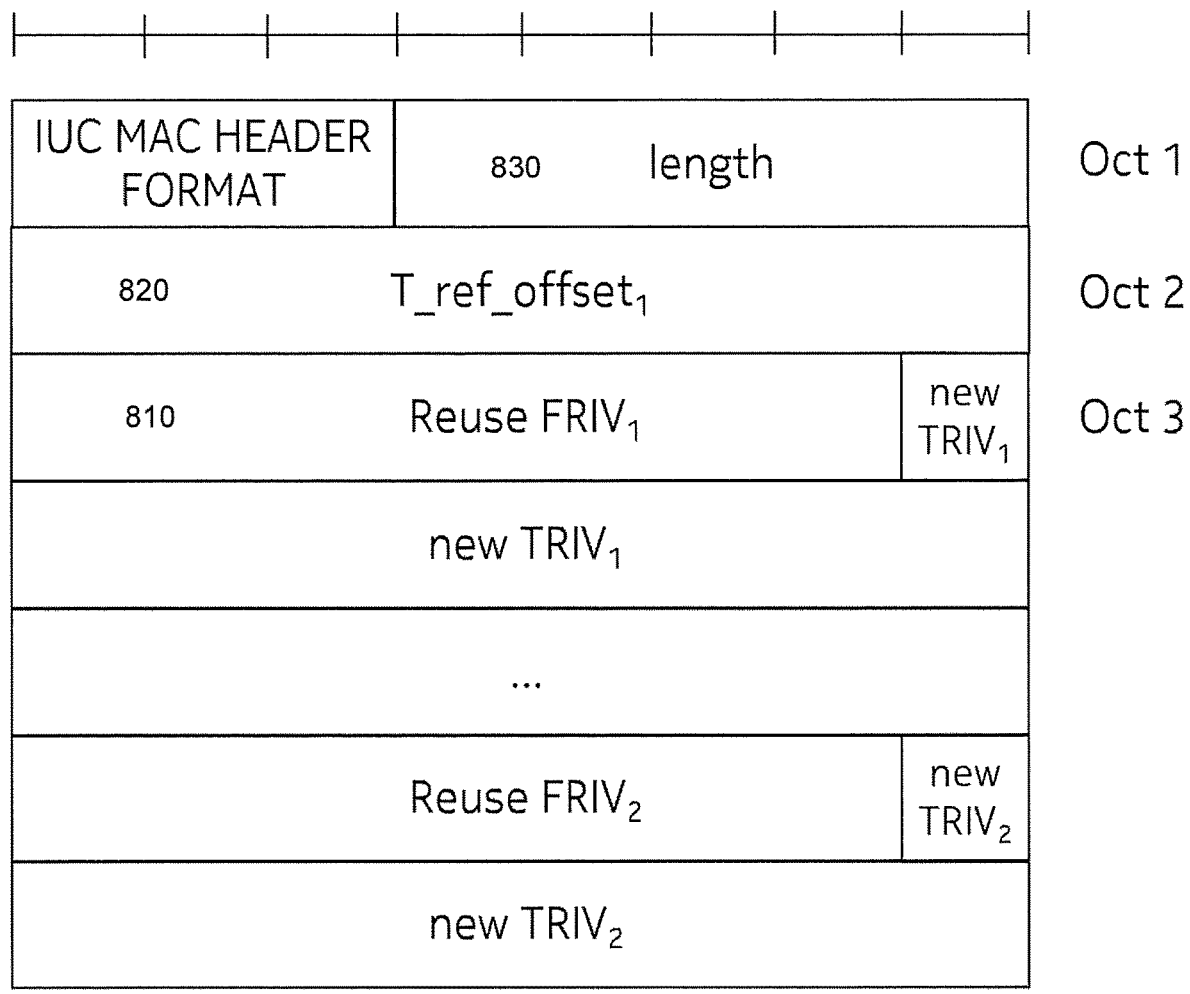
FIG. 8 is a diagram illustrating features as described herein.

Referring now to FIG. 8, illustrated is an example of MAC CE format 100. FRIVs may be reused with new TRIVs. In the example of FIG. 8, the ReuseFRIV indication may be 7 bits (810) referring to the last 1 . . . 128 FRIV values, the time offset may be 8 bits (820) referring to an offset of 1 . . . 256 slots covering eight partitions, and length may be 5 bits (830) referring to the MAC size in bytes of 2^=max 32 octets.

Figure 9:
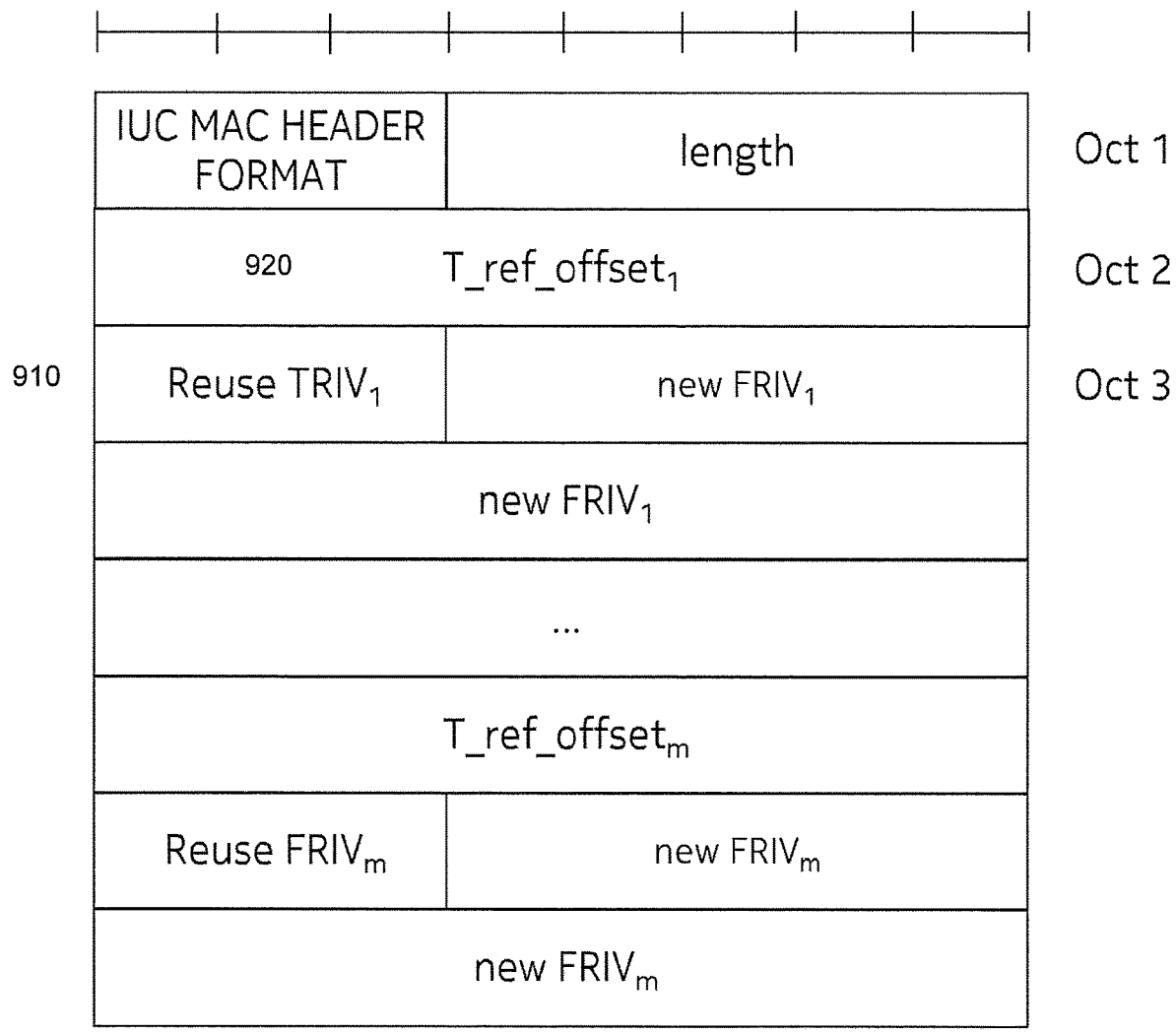
FIG. 9 is a diagram illustrating features as described herein.

Referring now to FIG. 9, illustrated is an example of MAC CE format 101. TRIVs may be reused with new FRIVs (in the example the ReuseTRIV indication may be 3 bits (910) referring to the last 1 . . . 8 TRIV values, and the time offset may be 8 bits (920) referring to an offset of 1 . . . 256 slots covering eight partitions.

Figure 10:
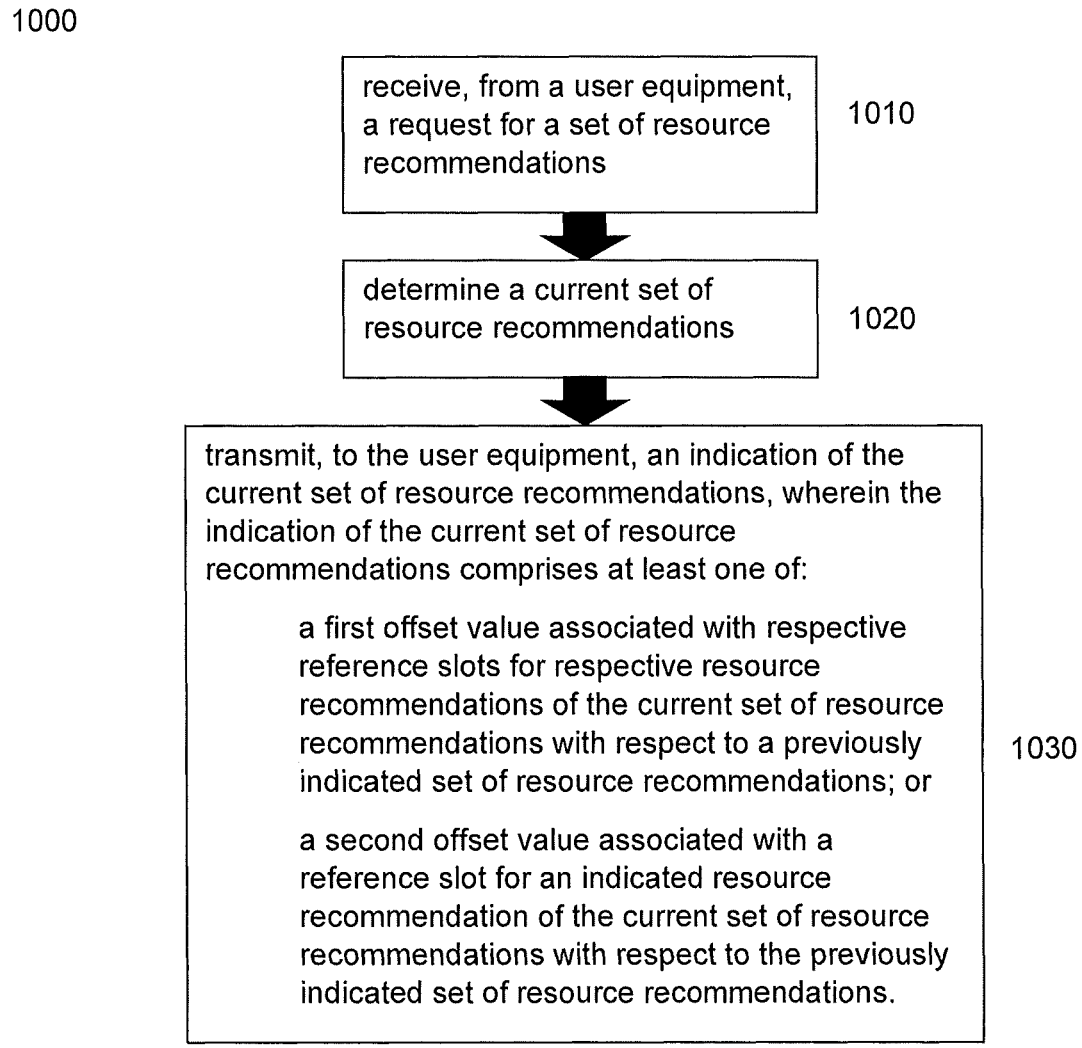
FIG. 10 is a flowchart illustrating steps as described herein.

FIG. 10 illustrates the potential steps of an example method 1000. The example method 1000 may include: receiving, from a user equipment, a request for a set of resource recommendations, 1010; determining a current set of resource recommendations, 1020; and transmitting, to the user equipment, an indication of the current set of resource recommendations, wherein the indication of the current set of resource recommendations comprises at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations, 1030. The example method 1000 may be performed, for example, by a UE-A or Rx UE. The first offset value may be comparable with T_ref_offset, as described above. The second offset value may be comparable with $D_k$, as described above.

Figure 11:
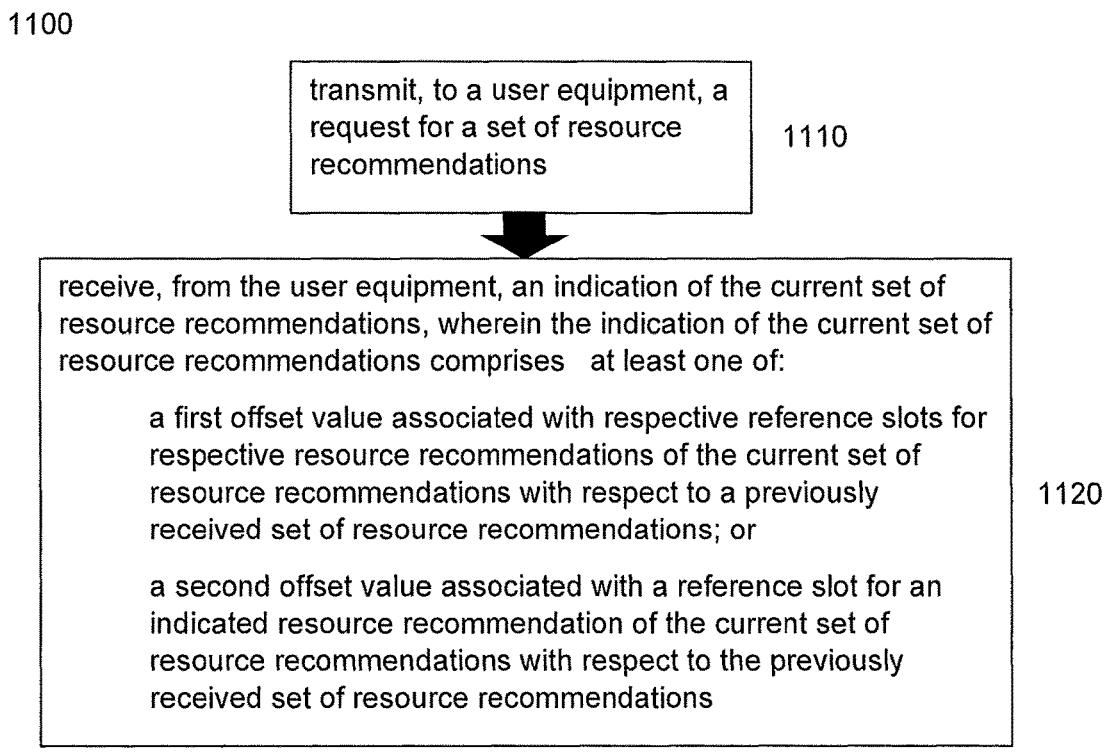
FIG. 11 is a flowchart illustrating steps as described herein.

FIG. 11 illustrates the potential steps of an example method 1100. The example method 1100 may include: transmitting, to a user equipment, a request for a set of resource recommendations, 1110; and receiving, from the user equipment, an indication of the current set of resource recommendations, wherein the indication of the current set of resource recommendations comprises at least one of: a first offset value associated with respective reference slots for respective resource recommendations of the current set of resource recommendations with respect to a previously received set of resource recommendations; or a second offset value associated with a reference slot for an indicated resource recommendation of the current set of resource recommendations with respect to the previously received set of resource recommendations, 1120. The example method 1100 may be performed, for example, by a UE-B or Tx UE. The first offset value may be comparable with T_ref_offset, as described above. The second offset value may be comparable with $D_k$, as described above.

In accordance with one example embodiment, an apparatus may comprise: at least one processor; and at least one memory including computer program code; the at least one memory and the computer program code configured to, with the at least one processor, cause the apparatus at least to: receive, from a user equipment, a request for a set of resource recommendations; determine a current set of resource recommendations; and transmit, to the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

The indication of the current set of resource recommendations may be configured to indicate at least one of: at least one time resource recommendation, at least one frequency resource recommendation, or at least one reference slot for the at least one time resource recommendation.

The indication of the current set of resource recommendations may be configured to at least partially omit at least one resource recommendation common to both the current set of resource recommendations and the previously indicated set of resource recommendations.

The example apparatus may be further configured to: determine whether the current set of resource recommendations is different from the previously indicated set of resource recommendations; and generate the indication of the current set of resource recommendations based, at least partially, on a determination of whether the current set of resource recommendations is different from the previously indicated set of resource recommendations.

The indication of the current set of resource recommendations may be configured to include a modification to a resource recommendation of the previously indicated set of resource recommendations, wherein the modification may be configured to modify the resource recommendation to match a resource of the current set of resource recommendations.

The example apparatus may be further configured to: determine a resource selection window; determine the current set of resource recommendations based, at least partially, on the determined resource selection window; and determine whether the current set of resource recommendations is different from the previously indicated set of resource recommendations with respect to the determined resource selection window.

The determined resource selection window may be shifted with respect to a previous resource selection window associated with the previously indicated set of resource recommendations, wherein the current set of resource recommendations may be determined to be different from the previously indicated set of resource recommendations based, at least partially, on the determined resource selection window being shifted with respect to the previous resource selection window.

The indication of the current set of resource recommendations may be configured to indicate reuse of the previously indicated set of resource recommendations.

The indication of the current set of resource recommendations may comprise at least one of: an indication to reuse a time resource indication value associated with a resource recommendation of the previously indicated set of resource recommendations, an indication to reuse a frequency resource indication value associated with the resource recommendation, an indication to reuse the time resource indication value and the frequency resource indication value, an indication to reuse a reference slot associated with the resource recommendation, the time resource indication value, and the frequency resource indication value, or an indication to reuse the previously indicated set of resource recommendations.

The indication of the current set of resource recommendations may comprise, at least, an identifier of the previously indicated set of resource recommendations.

Transmitting the indication of the current set of resource recommendations may comprise the example apparatus being configured to include the indication in at least one of: a medium access control element, or a sidelink control information message.

The indication of the current set of resource recommendations may comprise a reference signal received power threshold used for determining the current set of resource recommendations.

In accordance with one aspect, an example method may be provided comprising: receiving, from a user equipment, a request for a set of resource recommendations; determining a current set of resource recommendations; and transmitting, to the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

The example method may further comprise: determining whether the current set of resource recommendations is different from the previously indicated set of resource recommendations; and generating the indication of the current set of resource recommendations based, at least partially, on a determination of whether the current set of resource recommendations is different from the previously indicated set of resource recommendations.

the indication of the current set of resource recommendations may be configured to indicate reuse of the previously indicated set of resource recommendations.

The indication of the current set of resource recommendations may comprise at least one of: an indication to reuse a time resource indication value associated with a resource recommendation of the previously indicated set of resource recommendations, an indication to reuse a frequency resource indication value associated with the resource recommendation, an indication to reuse the time resource indication value and the frequency resource indication value, an indication to reuse a reference slot associated with the resource recommendation, the time resource indication value, and the frequency resource indication value, or an indication to reuse the previously indicated set of resource recommendations.

In accordance with one example embodiment, an apparatus may comprise: circuitry configured to perform: receive, from a user equipment, a request for a set of resource recommendations; determine a current set of resource recommendations; and transmit, to the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one example embodiment, an apparatus may comprise: processing circuitry; memory circuitry including computer program code, the memory circuitry and the computer program code configured to, with the processing circuitry, enable the apparatus to: receive, from a user equipment, a request for a set of resource recommendations; determine a current set of resource recommendations; and transmit, to the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving, from a user equipment, a request for a set of resource recommendations; determining a current set of resource recommendations; and transmitting, to the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one example embodiment, a non-transitory computer-readable medium comprising program instructions stored thereon which, when executed with at least one processor, cause the at least one processor to: receive, from a user equipment, a request for a set of resource recommendations; determine a current set of resource recommendations; cause transmitting, to the user equipment, of an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with another example embodiment, a non-transitory program storage device readable by a machine may be provided, tangibly embodying a program of instructions executable by the machine for performing operations, the operations comprising: receive, from a user equipment, a request for a set of resource recommendations; determine a current set of resource recommendations; cause transmitting, to the user equipment, of an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one example embodiment, an apparatus may comprise: at least one processor; and at least one memory including computer program code; the at least one memory and the computer program code configured to, with the at least one processor, cause the apparatus at least to: transmit, to a user equipment, a request for a set of resource recommendations; and receive, from the user equipment, an indication of the current set of resource recommendations, wherein the indication of the current set of resource recommendations may comprise at least one of: a first offset value associated with respective reference slots for respective resource recommendations of the current set of resource recommendations with respect to a previously received set of resource recommendations; or a second offset value associated with a reference slot for an indicated resource recommendation of the current set of resource recommendations with respect to the previously received set of resource recommendations.

The indication of the current set of resource recommendations may be configured to include a modification to a resource recommendation of the previously received set of resource recommendations, wherein the modification may be configured to modify the resource recommendation to match a resource of the current set of resource recommendations.

The indication of the current set of resource recommendations may be configured to indicate reuse of the previously received set of resource recommendations.

The indication of the current set of resource recommendations may comprise at least one of: an indication to reuse a time resource indication value associated with a resource recommendation of the previously received set of resource recommendations, an indication to reuse a frequency resource indication value associated with the resource recommendation, an indication to reuse the time resource indication value and the frequency resource indication value, an indication to reuse a reference slot associated with the resource recommendation, the time resource indication value, and the frequency resource indication value, or an indication to reuse the previously received set of resource recommendations.

Receiving the indication of the current set of resource recommendations may comprise the example apparatus being further configured to: receive the indication in at least one of: a medium access control element, or a sidelink control information message.

The indication of the current set of resource recommendations may comprise a reference signal received power threshold used for determining the current set of resource recommendations.

In accordance with one aspect, an example method may be provided comprising: transmitting, to a user equipment, a request for a set of resource recommendations; and receiving, from the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one example embodiment, an apparatus may comprise: circuitry configured to perform: transmit, to a user equipment, a request for a set of resource recommendations; and receive, from the user equipment, an indication of the current set of resource recommendations, wherein the indication of the current set of resource recommendations may comprise at least one of: a first offset value associated with respective reference slots for respective resource recommendations of the current set of resource recommendations with respect to a previously received set of resource recommendations; or a second offset value associated with a reference slot for an indicated resource recommendation of the current set of resource recommendations with respect to the previously received set of resource recommendations.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a request for a set of resource recommendations; and receive, from the user equipment, an indication of the current set of resource recommendations, wherein the indication of the current set of resource recommendations may comprise at least one of: a first offset value associated with respective reference slots for respective resource recommendations of the current set of resource recommendations with respect to a previously received set of resource recommendations; or a second offset value associated with a reference slot for an indicated resource recommendation of the current set of resource recommendations with respect to the previously received set of resource recommendations.

In accordance with one example embodiment, an apparatus may comprise means for performing: transmitting, to a user equipment, a request for a set of resource recommendations; and receiving, from the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with one example embodiment, a non-transitory computer-readable medium comprising program instructions stored thereon which, when executed with at least one processor, cause the at least one processor to: cause transmitting, to a user equipment, of a request for a set of resource recommendations; and receive, from the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

In accordance with another example embodiment, a non-transitory program storage device readable by a machine may be provided, tangibly embodying a program of instructions executable by the machine for performing operations, the operations comprising: cause transmitting, to a user equipment, of a request for a set of resource recommendations; and receive, from the user equipment, an indication of the current set of resource recommendations, wherein the indication of the current set of resource recommendations may comprise at least one of: a first offset value associated with respective reference slots for respective resource recommendations of the current set of resource recommendations with respect to a previously indicated set of resource recommendations; or a second offset value associated with a reference slot for an indicated resource recommendation of the current set of resource recommendations with respect to the previously indicated set of resource recommendations.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory including computer program code;
   the at least one memory and the computer program code configured to, with the at least one processor, cause the apparatus at least to:
     receive, from a user equipment, a request for a set of resource recommendations;
     determine a current set of resource recommendations; and
     transmit, to the user equipment, an indication of the current set of resource recommendations, wherein the indication of the current set of resource recommendations comprises at least one of:
       a first offset value associated with respective reference slots for respective resource recommendations of the current set of resource recommendations with respect to a previously indicated set of resource recommendations; or
       a second offset value associated with a reference slot for an indicated resource recommendation of the current set of resource recommendations with respect to the previously indicated set of resource recommendations.

2. The apparatus of claim 1, wherein the at least one memory and the computer program code are configured to, with the at least one processor, cause the apparatus to:
   determine whether the current set of resource recommendations is different from the previously indicated set of resource recommendations; and
   generate the indication of the current set of resource recommendations based, at least partially, on a determination of whether the current set of resource recommendations is different from the previously indicated set of resource recommendations.

3. The apparatus of claim 1, wherein the indication of the current set of resource recommendations is configured to include a modification to a resource recommendation of the previously indicated set of resource recommendations, wherein the modification is configured to modify the resource recommendation to match a resource of the current set of resource recommendations.

4. The apparatus of claim 1, wherein the at least one memory and the computer program code are configured to, with the at least one processor, cause the apparatus to:
   determine a resource selection window;

determine the current set of resource recommendations based, at least partially, on the determined resource selection window; and determine whether the current set of resource recommendations is different from the previously indicated set of resource recommendations with respect to the determined resource selection window.

5. The apparatus of claim 4, wherein the determined resource selection window is shifted with respect to a previous resource selection window associated with the previously indicated set of resource recommendations, wherein the current set of resource recommendations is determined to be different from the previously indicated set of resource recommendations based, at least partially, on the determined resource selection window being shifted with respect to the previous resource selection window.

6. The apparatus of claim 1, wherein the indication of the current set of resource recommendations is configured to indicate reuse of the previously indicated set of resource recommendations.

7. The apparatus of claim 6, wherein the indication of the current set of resource recommendations comprises at least one of:
  an indication to reuse a time resource indication value associated with a resource recommendation of the previously indicated set of resource recommendations,
  an indication to reuse a frequency resource indication value associated with the resource recommendation,
  an indication to reuse the time resource indication value and the frequency resource indication value,
  an indication to reuse a reference slot associated with the resource recommendation, the time resource indication value, and the frequency resource indication value, or
  an indication to reuse the previously indicated set of resource recommendations.

8. The apparatus of claim 1, wherein the indication of the current set of resource recommendations comprises, at least, an identifier of the previously indicated set of resource recommendations.

9. The apparatus of claim 1, wherein transmitting the indication of the current set of resource recommendations comprises the at least one memory and the computer program code are configured to, with the at least one processor, cause the apparatus to include the indication in at least one of:
  a medium access control element, or
  a sidelink control information message.

10. The apparatus of claim 1, wherein the indication of the current set of resource recommendations comprises a reference signal received power threshold used for determining the current set of resource recommendations.

11. A method comprising:
  receiving, from a user equipment, a request for a set of resource recommendations;
  determining a current set of resource recommendations; and
  transmitting, to the user equipment, an indication of the current set of resource recommendations, wherein the indication of the current set of resource recommendations comprises at least one of:
    a first offset value associated with respective reference slots for respective resource recommendations of the current set of resource recommendations with respect to a previously indicated set of resource recommendations; or
    a second offset value associated with a reference slot for an indicated resource recommendation of the current set of resource recommendations with respect to the previously indicated set of resource recommendations.

12. The method of claim 11, further comprising:
  determining whether the current set of resource recommendations is different from the previously indicated set of resource recommendations; and
  generating the indication of the current set of resource recommendations based, at least partially, on a determination of whether the current set of resource recommendations is different from the previously indicated set of resource recommendations.

13. The method of claim 11, wherein the indication of the current set of resource recommendations is configured to indicate reuse of the previously indicated set of resource recommendations.

14. The method of claim 11, wherein the indication of the current set of resource recommendations comprises at least one of:
  an indication to reuse a time resource indication value associated with a resource recommendation of the previously indicated set of resource recommendations,
  an indication to reuse a frequency resource indication value associated with the resource recommendation,
  an indication to reuse the time resource indication value and the frequency resource indication value,
  an indication to reuse a reference slot associated with the resource recommendation, the time resource indication value, and the frequency resource indication value, or
  an indication to reuse the previously indicated set of resource recommendations.

15. An apparatus comprising:
  at least one processor; and
  at least one non-transitory memory including computer program code;
  the at least one memory and the computer program code configured to, with the at least one processor, cause the apparatus at least to:
    transmit, to a user equipment, a request for a set of resource recommendations; and
    receive, from the user equipment, an indication of the current set of resource recommendations, wherein the indication of the current set of resource recommendations comprises at least one of:
      a first offset value associated with respective reference slots for respective resource recommendations of the current set of resource recommendations with respect to a previously received set of resource recommendations; or
      a second offset value associated with a reference slot for an indicated resource recommendation of the current set of resource recommendations with respect to the previously received set of resource recommendations.

16. The apparatus of claim 15, wherein the indication of the current set of resource recommendations is configured to include a modification to a resource recommendation of the previously received set of resource recommendations, wherein the modification is configured to modify the resource recommendation to match a resource of the current set of resource recommendations.

17. The apparatus of claim 15, wherein the indication of the current set of resource recommendations is configured to indicate reuse of the previously received set of resource recommendations.

18. The apparatus of claim 17, wherein the indication of the current set of resource recommendations comprises at least one of:
- an indication to reuse a time resource indication value associated with a resource recommendation of the previously received set of resource recommendations,
- an indication to reuse a frequency resource indication value associated with the resource recommendation,
- an indication to reuse the time resource indication value and the frequency resource indication value,
- an indication to reuse a reference slot associated with the resource recommendation, the time resource indication value, and the frequency resource indication value, or
- an indication to reuse the previously received set of resource recommendations.

19. The apparatus of claim 15, wherein receiving the indication of the current set of resource recommendations comprises the at least one memory and the computer program code are configured to, with the at least one processor, cause the apparatus to receive the indication in at least one of:
- a medium access control element, or
- a sidelink control information message.

20. The apparatus of claim 15, wherein the indication of the current set of resource recommendations comprises a reference signal received power threshold used for determining the current set of resource recommendations.

* * * * *